United States Patent
Tomas et al.

[19]

[11] Patent Number: 5,892,954
[45] Date of Patent: *Apr. 6, 1999

[54] METHOD AND APPARATUS FOR REFRESHING FILE LOCKS TO MINIMIZE CONFLICTING ACCESSES TO DATA FILES

[75] Inventors: Stephen P. Tomas, Half Moon Bay; Sunil P. Joshi, Campbell, both of Calif.

[73] Assignee: Sun Microsystems, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 499,591

[22] Filed: Jul. 7, 1995

[51] Int. Cl.$^6$ .................................................. G60F 13/00
[52] U.S. Cl. .......................... 395/726; 395/728; 395/727; 395/722; 711/106; 711/145; 711/152; 711/167
[58] Field of Search .................................... 395/726, 288, 395/490, 479, 494, 600, 650, 325, 425, 725, 843, 186, 474; 364/426.02

[56] References Cited

U.S. PATENT DOCUMENTS

| | | | |
|---|---|---|---|
| 5,148,368 | 9/1992 | Okubo | 364/426.02 |
| 5,170,481 | 12/1992 | Begun et al. | 395/725 |
| 5,202,971 | 4/1993 | Henson et al. | 395/425 |
| 5,287,521 | 2/1994 | Nitta et al. | 395/725 |
| 5,418,966 | 5/1995 | Madduri | 395/725 |
| 5,430,860 | 7/1995 | Capps, Jr. et al. | 395/425 |
| 5,442,755 | 8/1995 | Shibata | 395/325 |
| 5,469,576 | 11/1995 | Dauerer et al. | 395/186 |
| 5,490,270 | 2/1996 | Devarakonda et al. | 395/600 |
| 5,522,060 | 5/1996 | Kawase et al. | 395/479 |
| 5,526,524 | 6/1996 | Madduri | 395/725 |
| 5,537,645 | 7/1996 | Henson et al. | 395/650 |
| 5,544,353 | 8/1996 | Forman et al. | 395/600 |
| 5,551,054 | 8/1996 | Packer | 395/843 |
| 5,566,319 | 10/1996 | Lenz | 395/474 |
| 5,615,373 | 3/1997 | Ho | 395/726 |

*Primary Examiner*—Meng-Ai T. An
*Assistant Examiner*—Eric S. Thlang
*Attorney, Agent, or Firm*—Conley, Rose & Tayon, PC; B. Noel Kivlin

[57] ABSTRACT

A system for generating and maintaining lock files to inhibit conflicting requests for data files. A first process that accesses a data file generates a lock file to prohibit other processes from reading and/or writing that data file. Periodically the first process refreshes the lock file so that it shows a new modification time. A second process requesting access to the data file detect the lock file, stores the time of the attempted access, then waits a predetermined wait period and reads the lock file again. This is repeated, each time waiting for the wait period and again reading the lock file, until either (1) a predetermined time-out period passes without the first process refreshing the lock file, whereupon it is presumed that the process is defunct so the second process may access the data file; or (2) more than a maximum allowed access period of time has passed without the second process gaining access, i.e. the first process continues to refresh the lock file for greater than some predefined period. The refresh period is set to a relatively small period, so that if the first process dies the second process gains access to the data files quickly.

17 Claims, 3 Drawing Sheets

METHOD AND APPARATUS FOR REFRESHING FILE LOCKS TO MINIMIZE CONFLICTING ACCESSES TO DATA FILES

BACKGROUND OF THE INVENTION

This invention relates to the field of file access in computer systems, and in particular to mechanisms for controlling the ownership of a file that is accessed by multiple users.

Multi-user or multiprocessing computer systems generally provide mechanisms for controlling and coordinating access from multiple hosts or users to any given file. If a first user or process is accessing a file and has write permission to that file, it is important to ensure that no other users or processes have write permission at the same time, or they may write changes alternately, destroying one another's previously written alterations, resulting in file corruption or incorrect data. In widely distributed systems, this problem can become quite difficult to control.

Many operating systems, such as UNIX, do not include file locking primitives, so a mechanism for creating and controlling file locks is necessary. This need is answered by a number of locking mechanisms currently in use, such as server processes through which clients communicate in order to coordinate locking of files.

Another approach used by current systems is to create a special lock file when a file is accessed; the existence of the lock file indicates to other users or processes that the file is in use, and that it may not be modified until the lock file is deleted, which occurs only when the user or process is finished with modifications and has closed the file. (In this application, references to user actions may be taken to refer likewise to process actions, and vice versa.) Thus, in such systems the lock file is automatically created by a predetermined process when a process first accesses a file, and is likewise automatically removed when the process access is complete.

In this type of system, other processes waiting for access to the file must wait first for the lock (i.e. the lock file) to be removed by the locking process, and until then will refrain from accessing the file (or data). This scheme has the advantage of being simple to implement, since it relies upon the inherent capabilities of the underlying distributed file system, i.e. does not require the creation and maintenance of dedicated servers, which can be difficult to keep running. (Such a scheme is detailed in most UNIX programming books, e.g. *Advanced UNIX Programing* by Marc J. Rochkind (Prentice Hall 1985), which is incorporated herein by reference.)

However, a problem with such a scheme is that a process may "die" unexpectedly while holding a lock file, in which case other processes attempting to access the locked file will wait indefinitely, because the triggering event for allowing them access to the file—the removal of the lock file—will not occur.

A conventional solution for this problem is to provide a time-out period, i.e. a predefined period of time constituting the longest amount of time that any process might be expected to require access to a given file,. e.g a required data file. If another process attempts to access the file and determines that there is a lock file, it determines the length of time that the lock has been in existence, and if this is longer than the time-out period then the lock is "orphaned" and the newly accessing process removes it, and proceeds to access the data file.

In a widely distributed environment having data files that are shared by a large number of processes, orphaned locks can be quite common, resulting from network problems, system crashes, etc. A problem with the use of a time-out scheme in such a setting is that it is difficult to decide upon a useful time-out period. The period must be set high enough so that the maximum reasonably expected access period for the data files will not be truncated by the time-out mechanism. This means that processes attempting to access a data file will need to wait this maximum period every time a currently accessing process dies, which leads to numerous long wait periods in a system with a high number of processes that may die, resulting in poor system performance.

However, if the maximum reasonable wait period is defined as being very short, then accesses by currently running processes may have their perfectly valid locks removed, resulting in corrupted data.

Hence, a system is needed that solves this difficult compromise of time-out periods for currently accessing processes, both providing lock protection for processes accessing data files and minimizing delays to processes attempting to access the data files when a currently accessing process dies.

SUMMARY OF THE INVENTION

The present invention comprises a mechanism for refreshing file locks at regular intervals. At predetermined time intervals, a first, active process that has access to a given data file (resulting in the creation of a lock file) will refresh (i.e. "touch") the lock file, resulting in an alteration of the most-recent modification time. In typical systems, each file (including the lock files) will have an associated time stored with it, reflecting the most recent time that the file was modified.

When a second process attempts to access the data file, it finds the lock file, and reads the most-recent-modification time associated with it. This modification time is stored, along with the current time. The second process checks at periodic intervals to determine whether the lock file is modified again. If, after some predetermined time period, the modification time of the lock file has not been updated, this is an indication that the first process has not "touched" the lock file in that period of time, and hence indicates that the first process has died. The second process is then free to remove the lock file and access the data file.

The predetermined time period may be set to some minimal amount of time so that the wait period after a first such process dies does not unduly limit the overall performance of the system. In particular, it need not take into account the longest reasonably expected access time, as in conventional systems. However, long-lived process accesses to data files are fully accommodated by providing them with an effective mechanism for refreshing the lock files, so that later processes do not simultaneously access the data files and corrupt the data.

DESCRIPTION OF THE PREFERRED EMBODIMENTS

Figure 1:
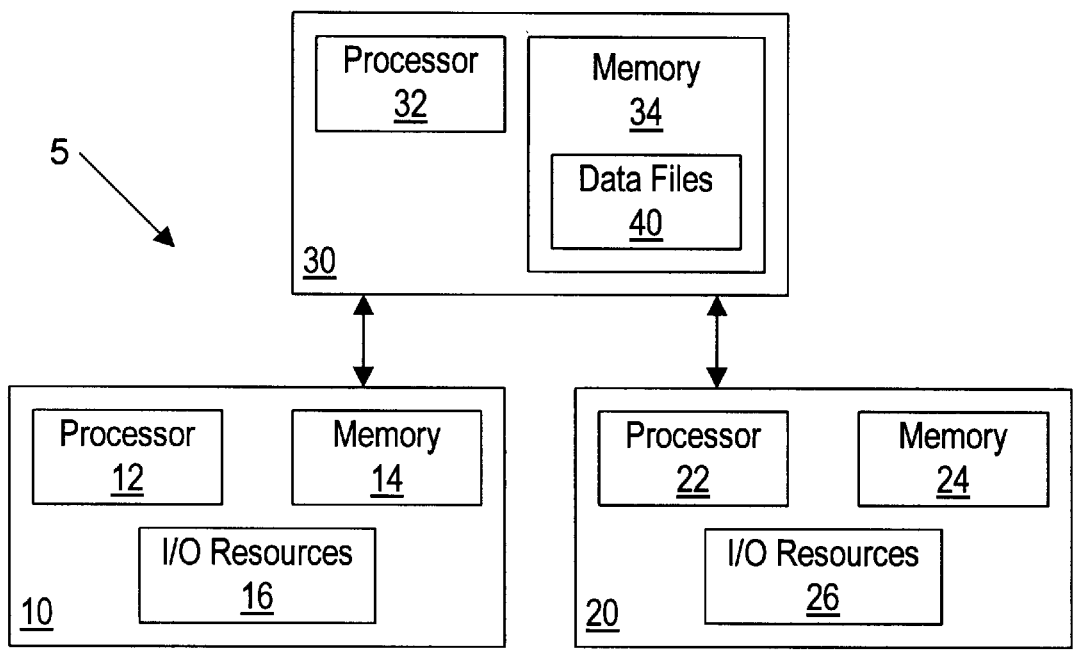
FIG. 1 is a block diagram of a multiprocessor system in connection with which the present invention may be used.

The present invention can be used to control access to files by the use of locks in either a uniprocessor system or a multiprocessor system. FIG. 1 shows a conventional multiprocessor system 5 including a first processor-based system 10, a second processor-based system 20, and a file server 30. The systems 10 and 20 include a standard processors 12 and 22, respectively, coupled to memories 14 and 24 and I/O resources 16 and 26, such as input-output devices including monitors, keyboards, mice or trackballs, or network connections. The multiprocessor system 5 may be any of a number of conventional MP systems, such as a tightly coupled shared-memory MP, a loosely coupled distributed-memory MP, or other suitable systems.

The server 30 likewise includes a processor 32 coupled to a memory 34 storing data files 40. The memories 14-24-34 are all conventional computer memories such as RAM, and in standard fashion store program instructions or modules configured to provide instructions to the respective processors to function in a manner as to implement the method of the present invention.

Figure 2:
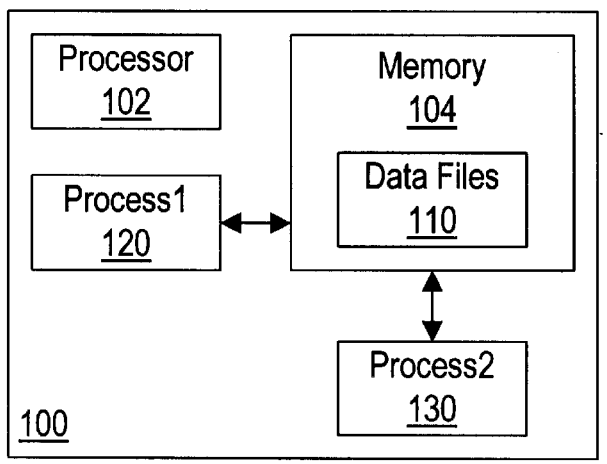
FIG. 2 is a block diagram of a uniprocessor system in connection with which the present invention may be used.

Alternatively, the present invention may be used in a uniprocessor system such as system 100 shown in FIG. 2, including a conventional processor 102 coupled to a standard memory 104 storing program instructions and data files 110, wherein processes 120 and 130 (illustrated separately) are running on the processor 102.

In either embodiment, conflicting access requests will typically arise for a given data or other type of file; the conflicts arise from different processes attempting to access the data file at the same time. The different processes may either be from different processors, as in FIG. 1, or may be different processes within a given processor, as in FIG. 2.

The data files 40 and 110 may be any files for which access is provided to multiple processes, including database records, text files, and so on. In the present disclosure, "data file" will be used to refer to any such files.

In conventional systems, there are different types of file locks in use currently, such as read locks and write locks. When a process accesses a data file, it may create a read lock, which prevents other processes from reading or writing that file. This prevents alteration of the data while the process reads and/or writes it, and prevents a new process from reading the data file while the current process is not yet finished with it. When the read operation is over, the lock file (i.e. the file reflecting the read lock) is removed, so other processes can now read the data file.

Another type of lock is a write lock, which is a lock file that prevents a newly requesting process from writing to the data file in question, but does not prevent the new process from reading the data file. This can prevent the new process from corrupting the data being read by a currently accessing process.

The present invention is useful in connection with either read locks or write locks, and other types of locks that may be used.

Figure 3:
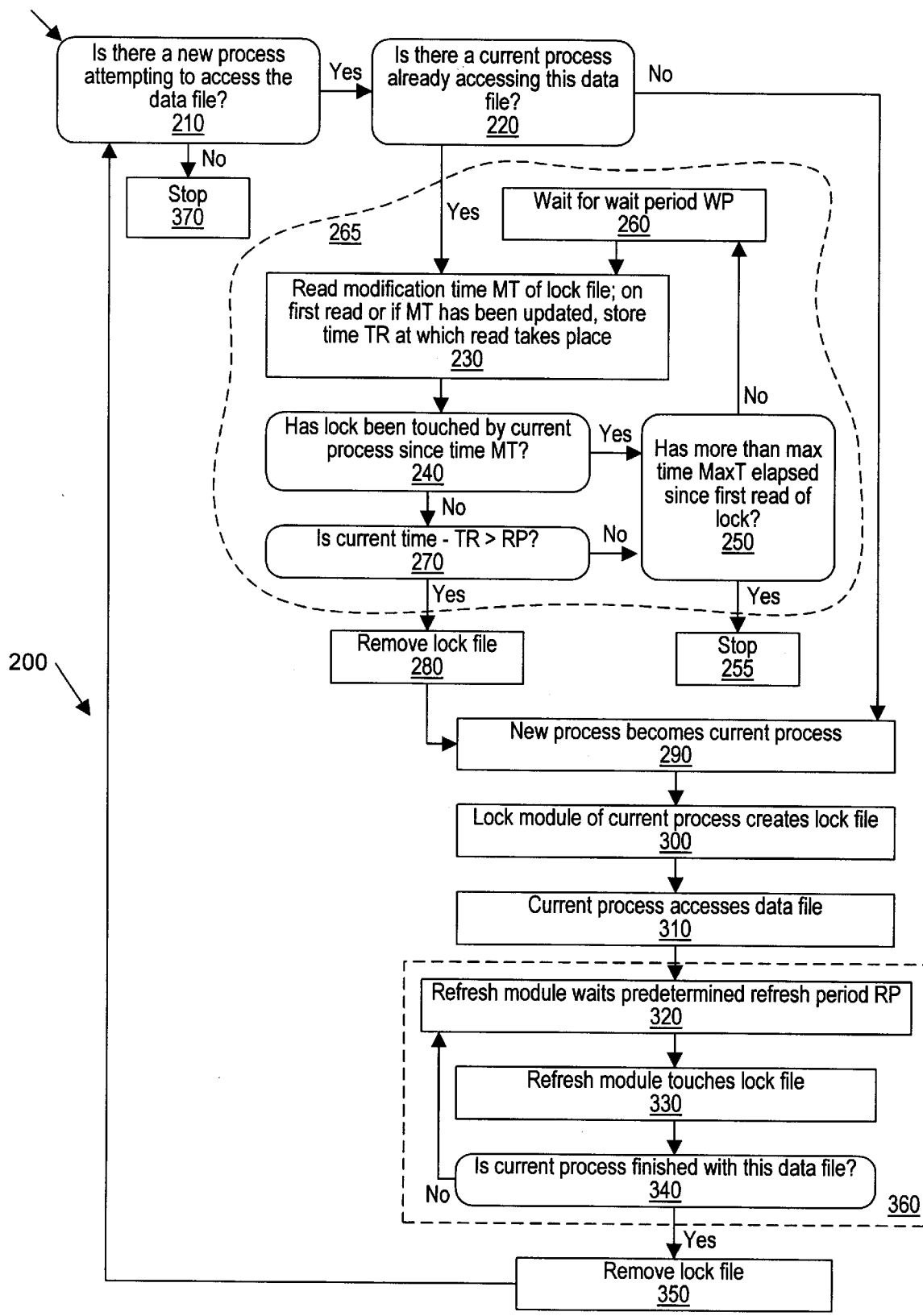
FIG. 3 is a flow chart illustrating a preferred embodiment of the method of the invention.
Figure 4:
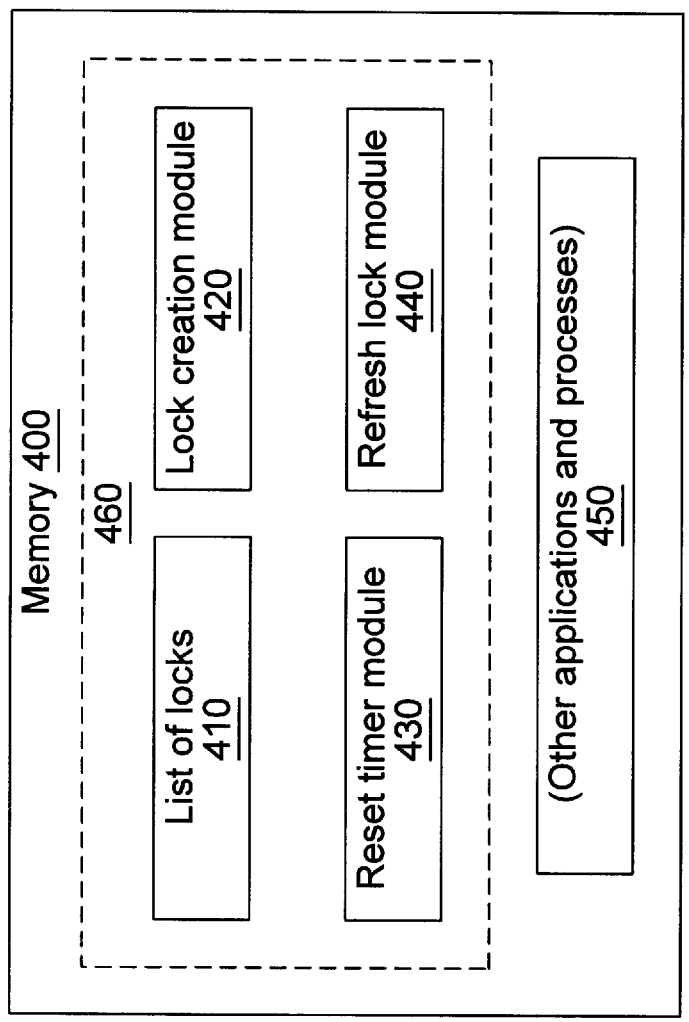
FIG. 4 is an illustration of a memory storing modules for carrying out the method of the invention.

Referring to FIG. 3, a method 200 is illustrated, which can be implemented by execution of program steps on one or more processors, such as processors 12-22-32 and 102. Certain segments of the method may be controlled by different program modules executed on different processors, as will be seen below. For instance, as shown in FIG. 4, a memory 400 (which may be any one of the memories 14-24-34-104) stores both a list of currently active lock files 410 and program modules 420–440 for, respectively, creating locks, resetting the lock timer, and refreshing the locks. These modules represent different processes that will execute on the respective processors. Other applications and processes 450 will typically also be present.

In the preferred embodiment, the list 410 of lock files is for that particular process or system that stores it. That is, each process maintains a list of lock files for data files accessed by that process or module, and there is hence no need to implement a global lock manager that manages all of the lock files for all accessed data files. A global lock manager could optionally be created that would handle this, if desired, and otherwise implement the features of the present invention as described above, but the invention obviates the need to do so.

As indicated, the modules 410–440 and other modules used for a particular implementation of the invention may be stored and executed on different systems as desired. For instance, each processor system 10 and 20 in FIG. 1 may include a lock-creation module such as module 420, and all three systems 10-20-30 may include a copy of the list of locks 410. Likewise, each system 10 and 20 (and 30) may include copies of the other modules 430 and 440.

The entire set of program modules 460 may alternatively be implemented as an application which is loaded onto each of the systems 10-20-30, and the separate modules are executed locally as needed. In the following discussion, this will be assumed to be the case, though different implementations are also appropriate (including a uniprocessor embodiment as in FIG. 2).

When access to a given data file in memory 34 (see FIG. 1) is requested by a process, as at box 210 in FIG. 3, the processor 32 (or other processor as deemed appropriate by the implementer) detects the access request. It then determines (box 220) whether a current process is already accessing that data file, i.e. Whether there is already some type of lock file in existence for that data file. Such lock files are reflected in table 410 (in FIG. 4).

If there is no current lock file, then the method proceeds to box 290, where the newly requesting process becomes the current process, and at box 300 it creates a lock file for the data file to be accessed. Then the current process accesses the data file (box 310).

After a predetermined period of time (the refresh period RP; see box 320), the refresh module of the current process "touches" the lock file (see box 330). The refresh period may, for instance, be 15 seconds. This is the conventional UNIX touch or some other process whereby the modification time of the lock file is updated to the current time.

Although the boxes 320 and 330 show steps carried out in a linear fashion with the other steps, it should be noted that the wait period and touching steps can be executed asynchronously with these other steps.

At box 340, it is determined whether the current process is finished with this data file. If so, the method proceeds to box 350, where the lock file is removed, and then to box 210.

If the current process is not yet finished, then in the method proceeds to step 320, thus forming a loop 360, causing the refresh module to repeatedly touch or refresh the lock file for the accessed data file for as long as the current process needs to access the data file.

At any time during this loop, a new process may attempt to access the data file, as at box 210. When this occurs, the method will determine at box 220 that there is a current process already accessing this data file (box 220), and thus will proceed to box 230. At box 230, the new process includes or accesses a module that reads the most recent modification time MT of the lock file (which is constantly being updated in loop 360). The first time the time MT is read by the new process, the time of reading the MT is stored.

At box 240, it is determined whether the lock has been touched by the current (not the new) process since time MT; if so, then the method proceeds to box 250. Here, it is determined whether more than a predetermined maximum allowed time MaxT has elapsed since the new process first began attempting to access this data file. If this elapsed time is greater than MaxT, this indicates that the current process is engaging in a long access process, so the new process gives up and stops at box 255. These steps 250–255 are optional but desirable steps. MaxT will typically be greater than the refresh period RP, such as on the order of 60 seconds.

Optionally, a step may be inserted between boxes 230 and 240 that tests whether the lock has by this time been removed; and if so, then the method can proceed to box 290, and otherwise proceeds to box 240.

If the MaxT period has not been exceeded, or in implementations that do not use this step, the method proceeds to box 260, where a predetermined wait period WP is waited. WP is preferably fairly short, such as on the order of one second. Then, at box 230 the new process (or its NT read module) again reads the modification time MT of the lock file, and if it has not changed, then the method proceeds to step 240 without altering the store time TR. Since in the example given the refresh period is 15 seconds and the wait period is one second, generally for any current process accessing the data file for more than the time RP (such that loop 360 is completed at least once), a new process attempting to access the data file may complete the loop 265 fifteen times before the time TR is updated.

When the current process again touches the lock file, assuming access is still under way, then this is detected by the new process at box 240, which proceeds to box 250. Otherwise, the method proceeds to box 270, and determines whether the current time minus the time TR at which a newly modified MT was detected exceeds the refresh period RP. That is, the new process determines the time at which it last stored a new value for TR, subtracts this from the present time, and if the result is greater than the refresh period RP, then it is evident that the lock file has not been touched in the last RP seconds (e.g. 15 seconds), so the current process is probably dead. In this case, the new process is allowed to remove the lock file at box 280, and at box 290 it becomes the current process. At box 310, the (newly) current process generates its own lock file for the data file, and the previous current process (presumed dead) is now locked out of the data file.

If, in box 270, the current time minus the time TR does not exceed the refresh period RP, then the current process must be assumed to be active, and hence the method proceeds to step 250 as before.

In a preferred embodiment, box 270 may be modified so that the current time minus TR must exceed the period RP by a certain additive factor NT, which takes into account normal network and system delays. For instance, the system may be configured to time out and remove a lock file only when the current time minus TR is greater than RP plus one to several seconds.

With the above mechanism, the time-out period is much shorter than the longest time a lock may be needed, as required by previous schemes. As a result, the system spends much less time waiting to clear "orphaned" locks, and there is much less probability that a valid lock is accidentally removed as orphaned, which could cause loss of data integrity.

In an alternative embodiment, in place of box 230 a step may be implemented wherein the new process (or its designated module) reads the most recent modification time of the lock file, subtracts that from the current time (i.e. the time of reading the modification time), and compares the difference to the refresh period. If the difference is greater than the refresh period, this indicates that the lock file has not been refreshed for a period of time longer than the refresh period, hence that the current process is probably dead. In this case, the method proceeds to step 280. If the time is less than the refresh period, then the method proceeds to step 250. Thus, this modified method step effectively replaces boxes 230-240-270 in FIG. 3.

This alternative implementation is most useful in a system wherein multiple processes (or processors) are fairly reliably synchronized, at least within an error of a few seconds or some relatively small fraction of the refresh period. If the refresh period is quite large, then the error in synchronization may be concomitantly larger. If the refresh period is only 15 seconds, then the necessity for synchrony to only a few seconds or preferably, some fraction of a second, is present.

The implementation of FIG. 3 is independent of any synchrony between the system clocks of different systems accessing the same data files.

Although a preferred set of program modules is shown in FIG. 4, it will be appreciated that practically any one or more of the boxes (or steps) in FIG. 3 may be implemented, singly in or multiples, as program modules stored in one or more of the memories of a given implementation of the invention. Thus, for instance, one or modules may be used that implement all or some portion of the steps of loop 265. The refresh lock module 440 may include instructions to implement all of the steps of loop 360. The lock creation module 460 preferably includes instructions to implement step 300. The reset timer module 430 is a module including instructions to implement the step 230 in FIG. 3, i.e. updating the time TR at which the first read of the time MT takes place, or a subsequent read when the time MT has been modified.

What is claimed is:

1. An apparatus for minimizing conflicts between requests to a data file initiated by a first process and a second process in a computer system, wherein said computer system includes at least one processor for executing processes and having a memory storing said data file and program modules including instructions executable on said processor, including:

a lock creation module including instructions to create a lock file corresponding to said data file upon a request by said first process to said data file, wherein said lock file contains a first parameter;

a refresh module including instructions to refresh said first parameter of said lock file continually on a periodic first time interval; and a reset timer module including instructions to read said first parameter of said lock file upon a request to said data file by said second process, and to repeat reading said first parameter continually on a periodic second time interval, and to remove said lock file and access said data file if said first parameter is not being refreshed according to said periodic first time interval.

2. The apparatus of claim 1, wherein said reset timer module further includes instructions to relinquish said request by said second process either upon the passage of a period of time greater than a predetermined maximum time or upon reaching a predetermined number of said reading said first parameter.

3. The apparatus of claim 1, wherein said reset timer module further includes instructions to access said data file upon removal of said lock file by said first process.

4. A method for minimizing conflicting accesses to a data file in a system including multiple processes issuing requests to said data file, including:

creating a lock file corresponding to said data file upon a first request for said data file by a first process, wherein said lock file contains a first parameter;

refreshing said first parameter of said lock file by said first process continually on a periodic first time interval;

locating said lock file by a second process upon a second request by said second process to said data file while said lock file exists;

examining said first parameter of said lock file by said second process continually on a periodic second time interval;

determining by said second process whether said first parameter of said lock file is being refreshed according to said periodic first time interval; and removing said lock file by said second process and accessing said data file if said first parameter is not being refreshed according to said periodic first time interval.

5. The method as recited in claim 4 wherein said determining includes comparing a value of said first parameter of said lock file with a clock time simultaneously initiated at a first of said examining of said first parameter.

6. The method as recited in claim 4 wherein said determining includes comparing said value of said first parameter of said lock file with a second value stored by said second process.

7. The method as recited in claim 4 wherein said determining includes comparing a current value of said first parameter with a previous value of said first parameter.

8. The method as recited in claim 7 wherein said second process removes said lock file and access said data file if said current value of said first parameter and said previous value of said parameter is the same.

9. The method as recited in claim 7 wherein said second process removes said lock file and access said data file if the difference between said current value of said first parameter and said previous value of said first parameter is either less than or greater than said first time interval.

10. The method as recited in claim 4 wherein said second process requesting said data file immediately access said data file if said lock file does not exist.

11. The method as recited in claim 4 wherein said second process removes said lock file and accesses said data file upon reaching a predetermined number of said second time interval.

12. The method as recited in claim 4 wherein either said first process is initiated in a first computer system and said second process is initiated in a second computer system, or said first process and said second process are initiated in the same computer system.

13. The method as recited in claim 4 wherein said data file is located either in said first computer system or said second computer system.

14. The method as recited in claim 12 wherein said first computer system and said second computer system each stores a list of at least one of said lock file.

15. A computer readable storage medium having instructions recorded therein, wherein said instructions are operable to, create a lock file corresponding to said data file upon a first request for said data file by a first process, wherein said lock file contains a first parameter;

refresh said first parameter of said lock file by said first process continually on a periodic first time interval;

locate said lock file by a second process upon a second request by said second process to said data file while said lock file exists;

examine said first parameter of said lock file by said second process continually on a periodic second time interval;

determine by said second process whether said first parameter of said lock file is being refreshed according to said periodic first time interval; and remove said lock file by said second process and accessing said data file if said first parameter is not being refreshed according to said periodic first time interval.

16. The computer readable storage medium as recited in claim 15 wherein said instructions operable to determine include instruction operable to compare a value of said first parameter of said lock file with a clock time simultaneously initiated at a first examining of said examine said first parameter by said second process.

17. The computer readable storage medium as recited in claim 15 wherein said second process removes said lock file and access said data file if a current value of said first parameter and a previous value of said parameter is the same, or if a difference between said current value of said first parameter and said previous value of said first parameter is either less than or greater than said first time interval.

* * * * *